US012135042B2

(12) United States Patent
Raju Chetty Shanmugam

(10) Patent No.: US 12,135,042 B2
(45) Date of Patent: Nov. 5, 2024

(54) FAN FOR A LIGHTING DEVICE OF A MOTOR VEHICLE

(71) Applicant: Hella GmbH & Co. KGaA, Lippstadt (DE)

(72) Inventor: Vignesh Raju Chetty Shanmugam, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/471,922

(22) Filed: Sep. 21, 2023

(65) Prior Publication Data

US 2024/0011506 A1 Jan. 11, 2024

Related U.S. Application Data

(63) Continuation of application No. PCT/EP2021/057356, filed on Mar. 23, 2021.

(51) Int. Cl.

*F04D 29/64* (2006.01)
*F04D 19/00* (2006.01)
*F04D 29/52* (2006.01)
*F04D 29/66* (2006.01)
*F21S 45/43* (2018.01)

(52) U.S. Cl.

CPC ......... *F04D 29/646* (2013.01); *F04D 19/002* (2013.01); *F04D 29/522* (2013.01); *F04D 29/668* (2013.01); *F21S 45/43* (2018.01)

(58) Field of Classification Search

CPC ....... F04D 29/646; F04D 29/668; F21S 45/43
See application file for complete search history.

(56) References Cited

U.S. PATENT DOCUMENTS

2006/0038106 A1 2/2006 Geroux et al.
2014/0186178 A1 7/2014 Willeke
2018/0142693 A1* 5/2018 Sawyer ................ F04D 29/083

FOREIGN PATENT DOCUMENTS

DE 102010045899 B3 2/2012
DE 202019105173 U1 11/2019

OTHER PUBLICATIONS

Schehr, English translation of DE 102010045899 B3, 2012 (Year: 2012).*

* cited by examiner

*Primary Examiner* — Michael L Sehn
(74) *Attorney, Agent, or Firm* — Husch Blackwell LLP

(57) ABSTRACT

A fan is provided for a lighting device of a motor vehicle, and includes an impeller, a frame, and a housing. The impeller is rotatably mounted on the frame. The housing is mountable on the lighting device, and the frame is form-lockingly fastened to the housing. The housing includes compliance elements, which are in preloaded contact with the frame, and which are designed for damping of vibrations of the frame along three spatial axes (X, Y, Z).

8 Claims, 6 Drawing Sheets

FAN FOR A LIGHTING DEVICE OF A MOTOR VEHICLE

CROSS REFERENCE

This application claims priority to PCT Application No. PCT/EP2021/057356, filed Mar. 23, 2021, the entirety of which is hereby incorporated by reference.

FIELD OF THE INVENTION

The present invention relates to a fan for a lighting device of a motor vehicle, at least comprising an impeller, a frame, and a housing, wherein the impeller is rotatably mounted on the frame, and wherein the housing is mountable on the lighting device.

BACKGROUND

Active cooling of lighting devices of motor vehicles, especially of headlights, is typically performed by means of fans generating a directional airflow inside the lighting device, especially around heat sink bodies in thermal contact with the light sources. The fan comprises a motor-operated impeller rotatably mounted on a frame, and the frame is attached to a fan housing, which is dedicated to being mounted in the lighting device, or which represents a section of the lighting device housing.

In the prior art, the attachment of the frame to the housing is typically set up by means of several screw joints. The screw joints establish a rigid coupling between the frame and the housing, so that during operation of the fan, i.e., during rotation of the impeller, any occurrent vibrations are exhaustively transmitted from the frame to the housing. Such transmission of vibrations yields undesirable generation of noise, which is a disturbing factor during vehicle operation. Especially in the case of electric vehicles generating only negligible engine noise, distinct fan noise may become particularly disturbing for passengers and/or passers-by.

BRIEF SUMMARY OF THE INVENTION

It is thus an object of the present invention to provide a fan for a lighting device of a motor vehicle, which is fixed in a robust way and allows for a basically noise-free fan operation.

The invention discloses the technical teaching that the frame is form-lockingly fastened to the housing, wherein the housing features compliance elements, which are in preloaded contact with the frame, and which are designed for damping of vibrations of the frame along three spatial axes.

The core of the invention lies in the introduction of compliance elements featuring dedicated elastic flexibility, which allow for absorption and thus damping of vibrational excitations. Vibrations released by the impeller and/or the related motor during fan operation can be dissipated as mechanical work for the elastic deformation of the compliance elements without being transmitted to the residual sections of the housing. Therefore, noise generation can be significantly suppressed with the inventive fan.

The frame is form-lockingly fastened to the housing, and in this fastened position the compliance elements form preloaded contacts with the frame to enable elastic resilience upon vibrational movement of the frame. Especially, the compliance elements are designed for robust fixing of the frame within the housing, i.e., the preloaded contacts with the frame contribute a significant share to the retention force holding and fixing the frame within the housing. The compliance elements each act along different spatial directions, so that the entire set of compliance elements allows for fixation and vibration damping along three spatial axes.

Advantageously, the three spatial axes are oriented mutually perpendicular, wherein a first axis and a second axis lay in a plane perpendicular to the rotation axis of the impeller, and wherein a third axis lays parallel to the rotation axis. Such a setup allows for a comprehensive damping of vibrational excitations.

As a preferred embodiment of the inventive fan, a first compliance element yielding compliance along the first axis features an arc-shaped rack split into two halves by a gap around the apex, so that the two halves are bendable, wherein the frame is in contact to the first compliance element around the apex. The contact with the fastened frame yields a slight bending of the two halves and the elastic energy thus stored in the first compliance element exerts a pre-load on the contact with the frame.

Furthermore, a second compliance element yielding compliance along the second axis advantageously features a beam with a free end section and a concave bending towards the frame, wherein the frame is in contact to the second compliance element at the free end section. The beam exerts an elastic, inward directed force on the fastened frame.

Moreover, a third compliance element yielding compliance along the third axis features a beam with a protruding contact section, wherein the frame is in contact to the third compliance element at the contact section.

Exemplarily, the housing features at least one latch arm engaging with a corresponding receiving section of the frame, so that the frame is fastened along the first axis. Additionally, the housing advantageously features at least two opposite notch sections enclosing corresponding tongue sections of the frame, so that the frame is fastened along the second axis and the third axis. Such a setup yields a form-locking and easy to assemble fastening of the frame with the housing without any rigid screw joints.

Preferably, the housing features a thermoplastic polymer, especially polypropylene. Thermoplastic polymers offer convenient mechanical properties yielding the desired elastic flexibility of the inventive compliance elements. paths are created for radiation of a different wavelength. In particular, a polychromatic emission of multiple wavelengths can be advantageously provided from a single laser cavity.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1A:
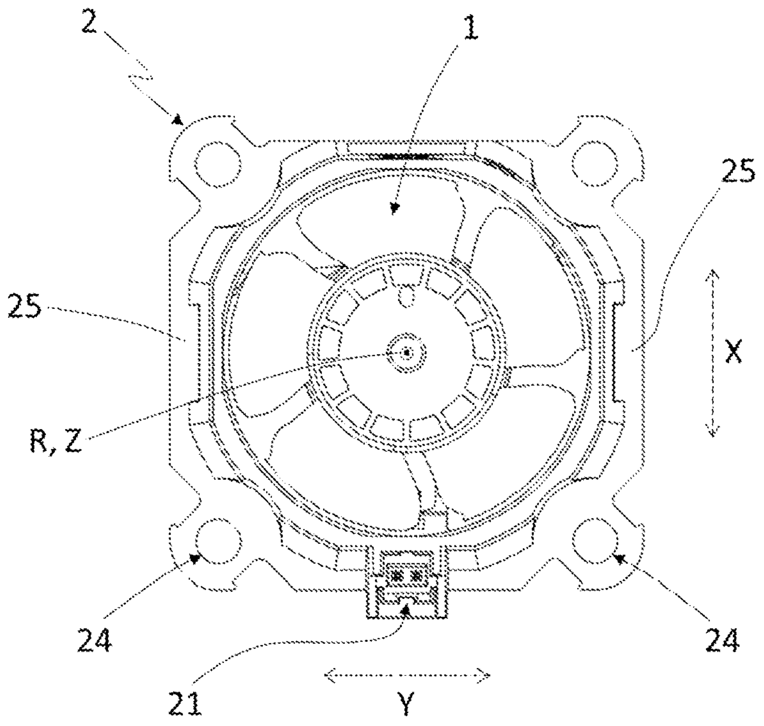
FIGS. 1*a*-1*c* illustrate front views of the preferred embodiment.
Figure 1B:
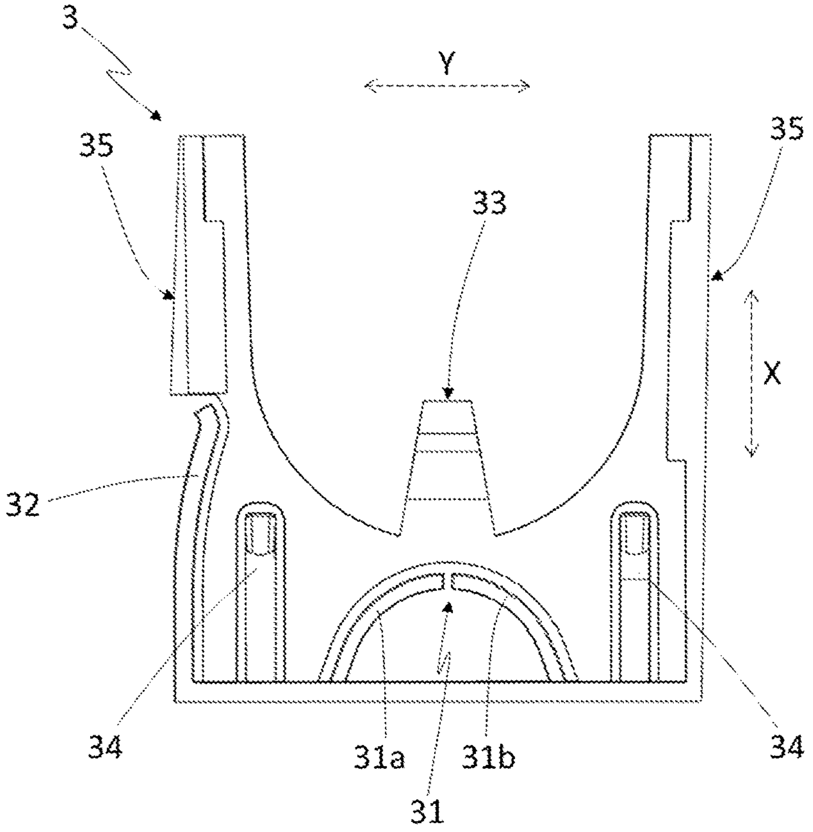
Figure 1C:
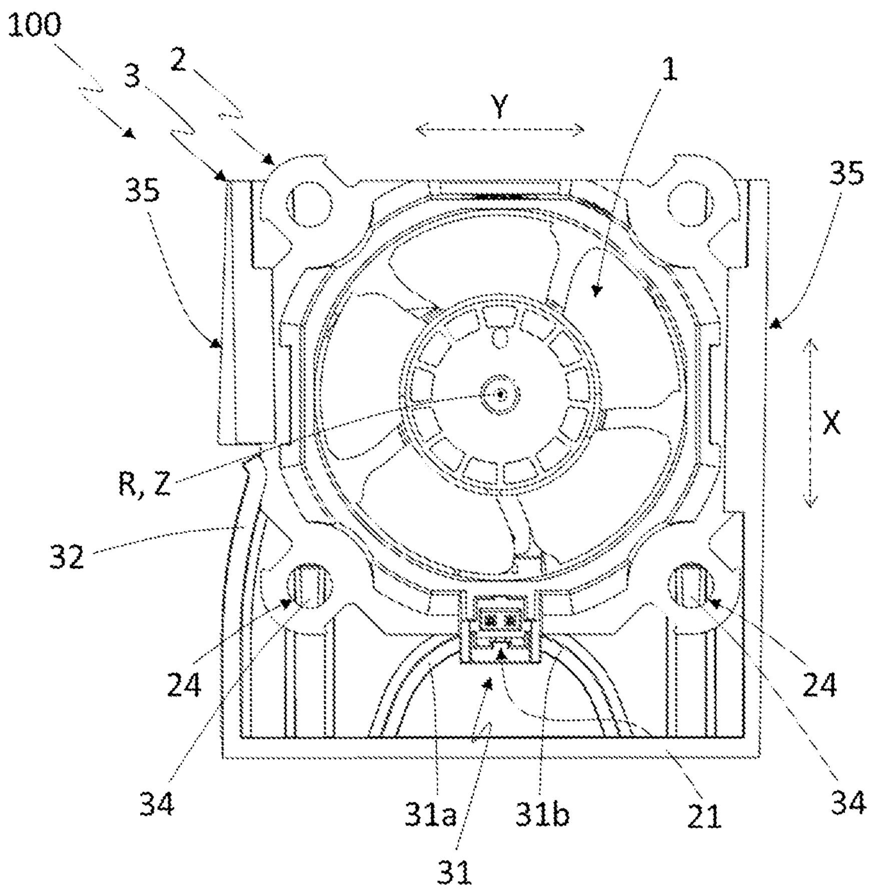
Figure 2A:
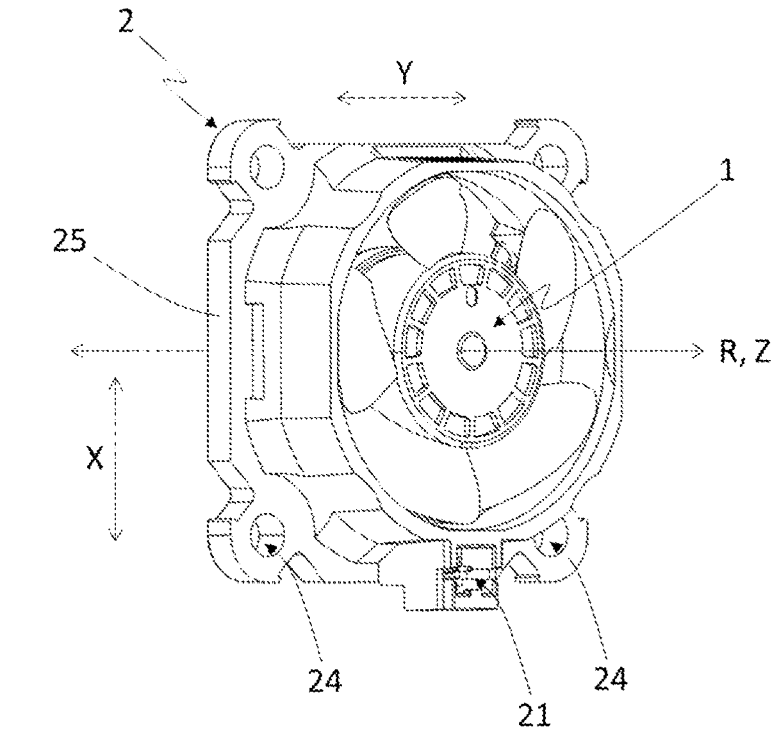
FIGS. 2*a*-2*c* illustrate perspective views of the preferred embodiment.
Figure 2B:
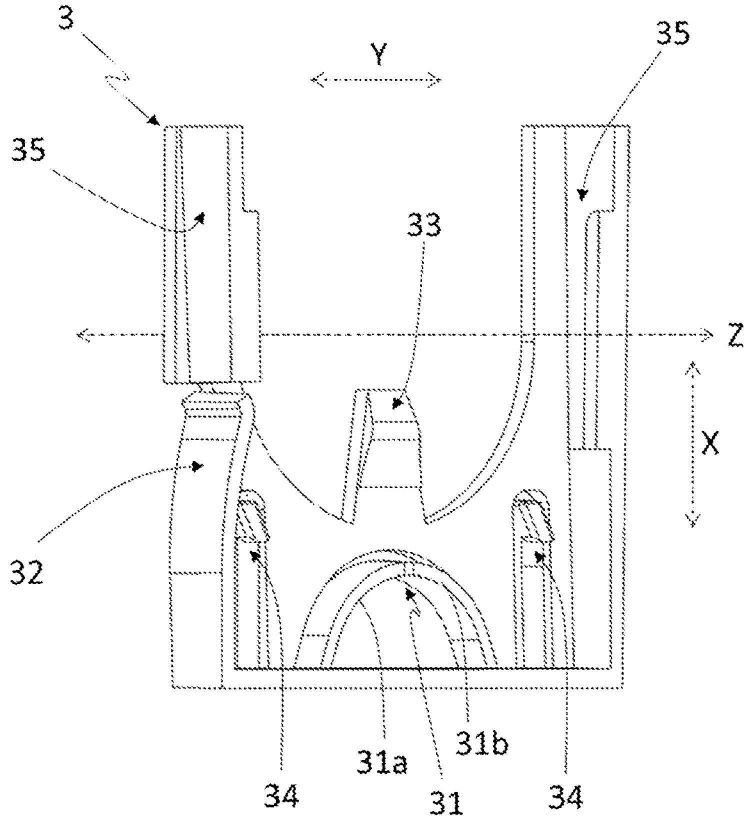
Figure 2C:
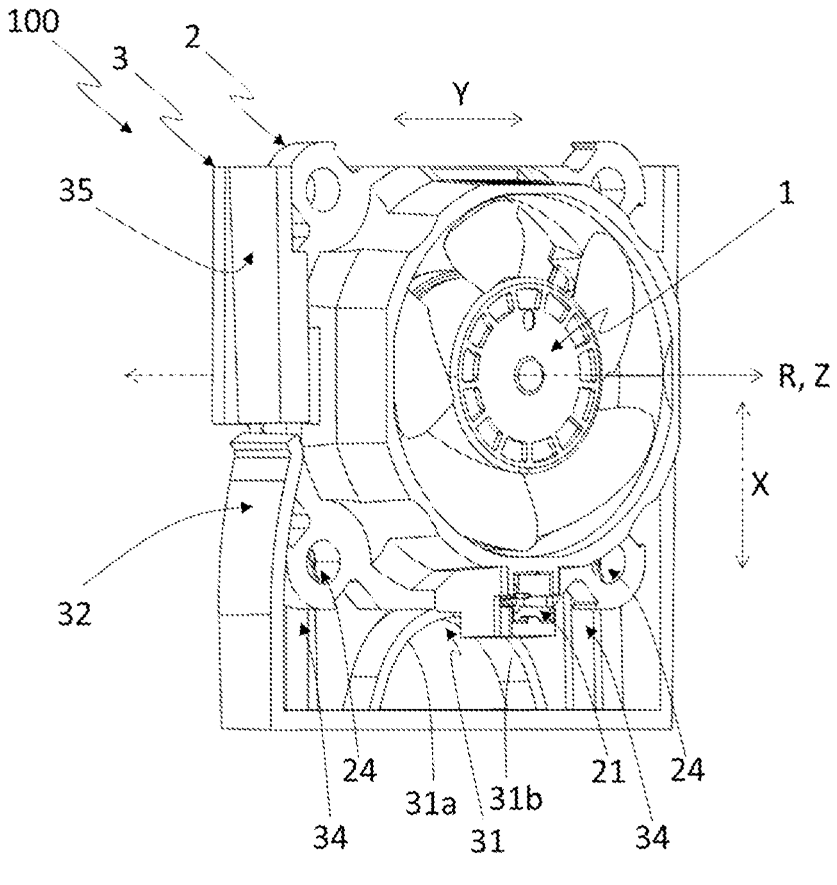
Figure 3A:
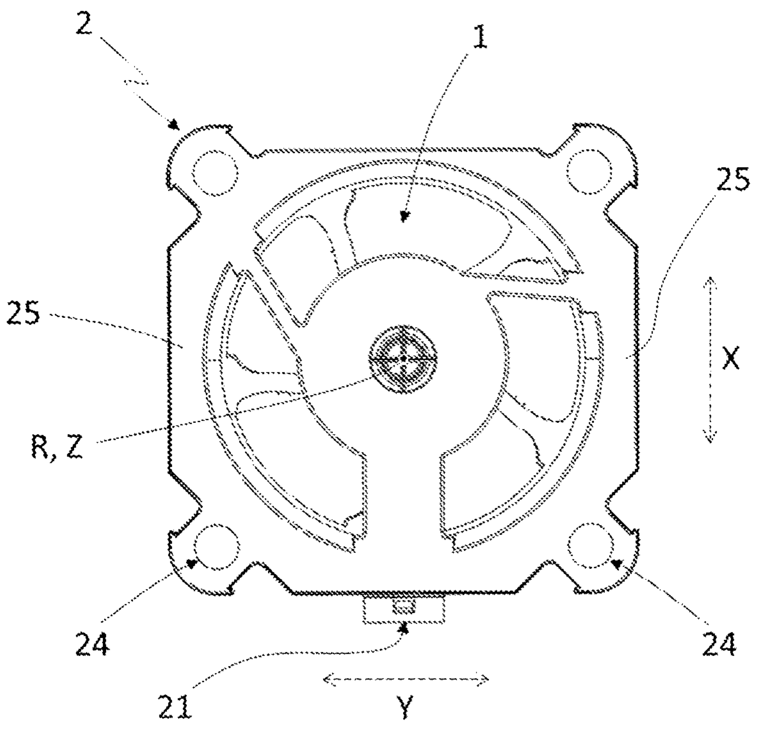
FIGS. 3*a*-3*c* illustrate rear views of the preferred embodiment.
Figure 3B:
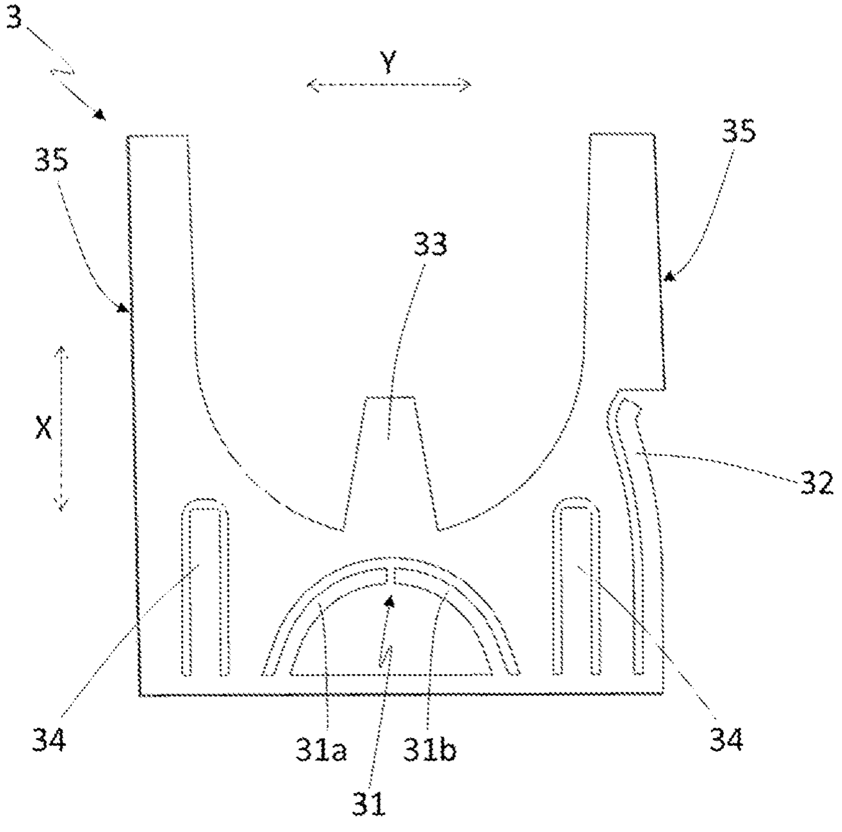
Figure 3C:
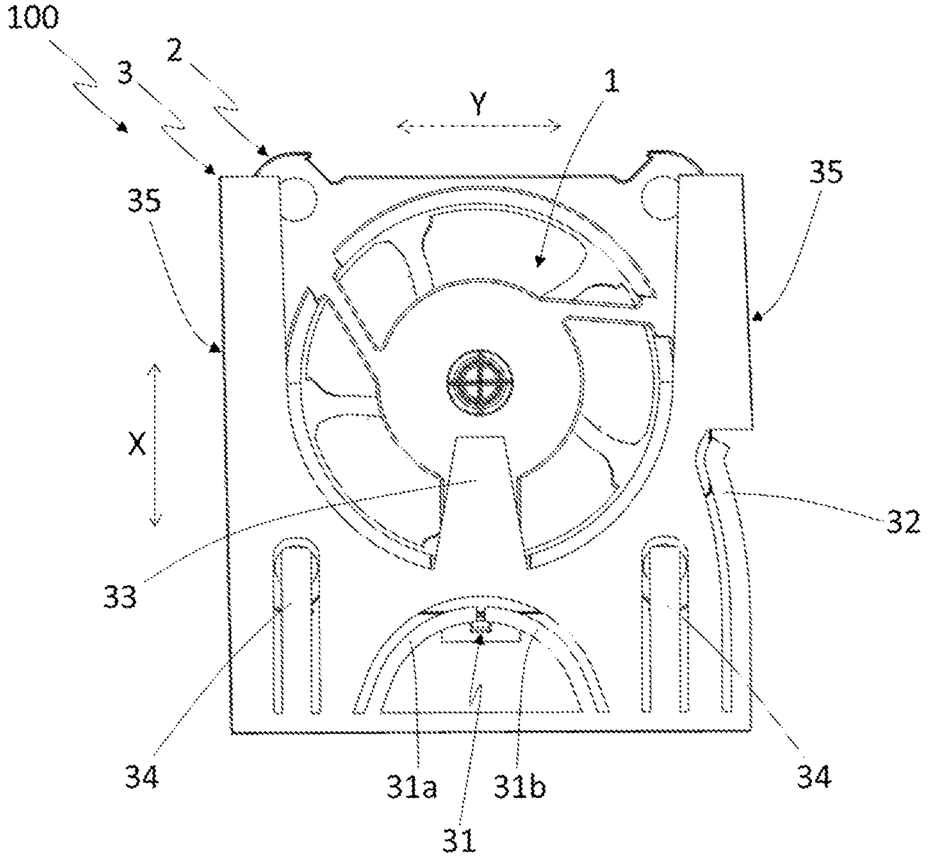

The FIGURES show the preferred embodiment of the inventive fan 100 in front (FIGS. 1*a*-1*c*), perspective (FIGS. 2*a*-2*c*) and rear view (FIGS. 3*a*-3*c*), wherein FIGS. 1*a*, 2*a*, 3*a* each show the isolated frame 2, FIGS. 1*b*, 2*b*, 3*b* each show the isolated housing 3, and FIGS. 1*c*, 2*c*, 3*c* each show the entire assembled fan 100.

The impeller 1 is mounted in the frame 2 rotatably around the rotation axis R likewise representing the third axis Z. The central body of the impeller 1 contains an electric motor, which is accessible for power and control signals via the electrical connection 21. The frame 2 features four peripheral holes being originally intended for screw joints according to the prior art, two of which here serve as the receiving sections 24 for the snap-connection with the latch arms 34, i.e., with the detent lugs at the free ends of the latch arms 34 engaging with the receiving sections 24. In this way, the frame 2 is fastened to the housing 3 mainly along the first axis X. Fastening of the frame 2 along the second axis Y and the third axis Z is provided by the tongue sections 25 engaging with the corresponding notch sections 35 of the housing 3. This design accounts for a very convenient assembly process of the inventive fan 100, wherein the tongue sections 25 are inserted into the open ends of the notch sections 35 (from the upper side in the FIGURES) and the frame is afterwards shifted along the first axis X (from top to bottom in the FIGURES) until the latch arms 34 engage with the receiving sections 24.

The first compliance element 31 yielding compliance along the first axis X features an arc-shaped rack split into the two halves 31*a*, 31*b* by the gap around the apex, so that the two halves 31*a*, 31*b* are bendable, wherein the frame 2 is in contact to the first compliance element 31 around the apex. The second compliance element 32 yielding compliance along the second axis Y features a beam with a free end section and a concave bending towards the frame 2, wherein the frame 2 is in contact to the second compliance element 32 at the free end section. The third compliance element 33 yielding compliance along the third axis Z features a straight beam with a protruding contact section, wherein the frame 2 is in contact to the third compliance element 33 at the protruding contact section.

In the idle position of the frame 2 relative to the housing 3, all three compliance elements 31, 32, 33 are slightly bent outwards, i.e., elastically deformed, and thus exert a force towards the frame 2, i.e., yield preloaded contacts with the frame 2. Upon vibration of the frame 2 during operation of the impeller 1, the preloaded compliance elements 31, 32, 33 maintain their contacts with the frame 2 and impose a resistance against the vibrational movement of the frame 2, which yields an effective damping. The transmission of vibrations from the frame 2 to the housing 3 is thereby largely suppressed and a very low noise operation of the inventive fan 100 enabled.

The present invention is not limited by the embodiment described above, which is represented as an example only and can be modified in various ways within the scope of protection defined by the appending patent claims.

LIST OF NUMERALS

100 fan
1 impeller
2 frame
21 electrical connection
24 receiving section
25 tongue section
3 housing
31 first compliance element
31*a, b* rack half
32 second compliance element
33 third compliance element
34 latch arm
35 notch section
R rotation axis
X first axis
Y second axis
Z third axis

I claim:

1. A fan for a lighting device of a motor vehicle, the fan comprising:

a frame;

an impeller rotatably mounted on the frame; and a housing mountable on the lighting device;

wherein the frame is form-lockingly fastened to the housing, wherein the housing includes a plurality of compliance elements which are in preloaded contact with the frame and which damp vibrations of the frame along three spatial axes (X, Y, Z), wherein the three spatial axes (X, Y, Z) are oriented mutually perpendicular to one another, wherein a first axis (X) and a second axis (Y) lay in a plane perpendicular to a rotation axis (R) of the impeller, and wherein a third axis (Z) lays parallel to the rotation axis (R), wherein a first compliance element of the plurality of compliance elements yields compliance along the first axis (X), the first compliance element including an arc-shaped rack split into two halves by a gap positioned and located proximate to an apex of the arc-shaped rack such that the two halves are bendable, wherein the frame is in contact with the first compliance element proximate to the apex.

2. The fan according to claim 1, wherein the plurality of compliance elements are designed for fixing the frame within the housing.

3. The fan according to claim 1, wherein a second compliance element of the plurality of compliance elements yields compliance along the second axis (Y), the second compliance element including a beam with a free end section and a concave bending towards the frame, wherein the frame is in contact with the second compliance element at the free end section.

4. The fan according to claim 1, wherein a third compliance element of the plurality of compliance elements yields compliance along the third axis (Z), the third compliance element including a beam with a protruding contact section, wherein the frame is in contact with the third compliance element at the contact section.

5. The fan according to claim 1, wherein the housing includes at least one latch arm engaging with a corresponding receiving section of the frame, so that the frame is fastened along the first axis (X).

6. The fan according to claim 1, wherein the housing includes at least two opposite notch sections enclosing corresponding tongue sections of the frame, so that the frame is fastened along the second axis (Y) and along the third axis (Z).

7. The fan according to claim 1, wherein the housing includes a thermoplastic polymer.

8. The fan according to claim 1, wherein the housing includes polypropylene.

* * * * *